United States Patent [19]

Wendel et al.

[11] Patent Number: 5,690,070

[45] Date of Patent: *Nov. 25, 1997

[54] APPARATUS FOR GOVERNING THE IDLING RPM OF AN INTERNAL COMBUSTION ENGINE

[75] Inventors: Friedrich Wendel, Weissach; Johannes Meiwes, Markgroningen; Albert Gerhard, Tamm; Uwe Hammer, Schwieberdingen; Dieter Dick, Muhlacker; Robert Torno, Bietigheim-Bissingen, all of Germany

[73] Assignee: Robert Bosch GmbH, Stuttgart, Germany

[*] Notice: The term of this patent shall not extend beyond the expiration date of Pat. No. 5,564,388.

[21] Appl. No.: 637,800

[22] PCT Filed: Apr. 12, 1995

[86] PCT No.: PCT/DE95/00506

§ 371 Date: Jun. 28, 1996

§ 102(e) Date: Jun. 28, 1996

[87] PCT Pub. No.: WO96/07821

PCT Pub. Date: Mar. 14, 1996

[30] Foreign Application Priority Data

Sep. 6, 1994 [DE] Germany ............... 44 31 711.5

[51] Int. Cl.[6] ................................................ F02M 69/32
[52] U.S. Cl. ........................................................ 123/339.25
[58] Field of Search .......................... 123/339.25, 339.24, 123/339.26, 339.27

[56] References Cited

U.S. PATENT DOCUMENTS 4,982,760  1/1991  Mustaklem ................. 137/559
5,170,761  12/1992  Kato et al. .................. 123/339
5,467,749  11/1995  Meiwes et al. ............. 123/339.27
5,564,338  10/1996  Meiwes et al. ............. 123/339.25

FOREIGN PATENT DOCUMENTS 2176102  10/1973  France.
4026137.9  3/1991  Germany.
58-085338  5/1983  Japan ........................ 123/339.24

OTHER PUBLICATIONS

Patent Abstracts of Japan, vol. 18, No. 691, (M-1731), Dec. 26, 1994, for JP 6-272645 (Kurita), Sep. 27, 1994.

Primary Examiner—Andrew M. Dolinar
Assistant Examiner—Hieu T. Vo
Attorney, Agent, or Firm—Edwin E. Greigg; Ronald E. Greigg

[57] ABSTRACT

An apparatus for governing an idling rpm of an internal combustion engine by controlling a quantity of operating fluid that can be supplied to the engine from an operating fluid source via at least two flow lines. A first valve opening cross section at a first valve opening is controlled by a first valve closing member, and a second valve opening cross section and a second valve opening is controlled by a second valve closing member. The first and second valve closing members are adjustable by an adjusting drive in such a manner that the first valve opening and the second valve opening are disposed parallel to one another between the operating medium source and the intake conduit of the engine. The valve closing members are coupled in such a way that upon their actuation, the first valve closing member always uncovers a flow cross section at the first valve opening first, and only then does the second valve closing member uncover a flow cross section at the second valve opening.

3 Claims, 11 Drawing Sheets

APPARATUS FOR GOVERNING THE IDLING RPM OF AN INTERNAL COMBUSTION ENGINE

BACKGROUND OF THE INVENTION

The invention is based on an apparatus for governing the idling rpm of an internal combustion engine. Such an apparatus is already known (Development of air-assisted injector system, SAE (Society of Automotive Engineers), Technical Paper Series 920294, pp. 57/58, 1992), in which a first valve closing member controls a first valve opening cross section to a first flow line, and a second valve closing member controls a second valve opening cross section to a second flow line. This first flow line communicates with a fuel metering device of the engine and serves to supply an operating medium, in particular aspirated air, to the fuel metering device for the sake of air-assisted fuel injection. The second flow line communicates directly with an intake conduit of the engine downstream of a throttle valve disposed in the intake conduit. Via the second flow line, operating medium can be supplied to the intake conduit and from there likewise to the engine. The first and second valve closing members are adjustable by means of an electric motor adjusting device via an adjusting member in the valve opening direction, counter to the force of a valve closing spring; when the adjusting drive is not activated, the valve closing members are held by the valve closing spring in a valve closing position. The known apparatus has the disadvantage that because of the rotationally symmetrical embodiment of the valve openings and of the valve closing members cooperating with them, upon axial adjustment of the valve closing member in traversing an extremely short stroke path, practically the entire opening cross section is uncovered, so that purposeful uncovering of only a defined partial cross section can be accomplished technically only with great difficulty, especially if, as in the prior art discussed, two valve closing members are actuated by means of a single rodlike final control element. Moreover, a large amount of space is required along with major effort and expense for production and installation.

ADVANTAGES OF THE INVENTION

The apparatus according to the invention for governing the idling rpm of an internal combustion engine has the advantage over the prior art that a valve opening can be opened continuously, and until the attainment of a predetermined free flow cross section, with the aid of a valve slide that uncovers the associated valve opening beginning at a point on its peripheral region. This purposeful uncovering of a defined flow cross section can be accomplished without extreme demands for accuracy of the electric motor adjusting drive, since the valve slide, in the course of a linear motion, for instance, relative to the associated valve opening uncovers an increasingly larger area thereof, so that until the opening is fully opened a certain amount of throttle action is preserved.

In a feature of the invention, the possibility advantageously exists of adapting the shape of the opening and/or of the slide to the characteristic of the adjusting drive in such a way that a desired characteristic course of the uncovering of the flow cross section is attainable as a function of the actuation of the adjusting drive. In the apparatus of the invention the advantage is also attained that it is simple to manufacture and to install and also requires little space.

By means of the provisions recited, advantageous further features of and improvements to the apparatus of the invention are possible.

BRIEF DESCRIPTION OF THE DRAWING

The invention will be described in further detail below in conjunction with the drawings.

DETAILED DESCRIPTION OF THE EXEMPLARY EMBODIMENTS

Before various exemplary embodiments of the invention are described in detail below, a preferred fundamental principle of an apparatus for governing the idling rpm of an internal combustion engine with air-assisted fuel injection be discussed in detail, in conjunction with the schematic illustration of FIG. 1.

Figure 1:
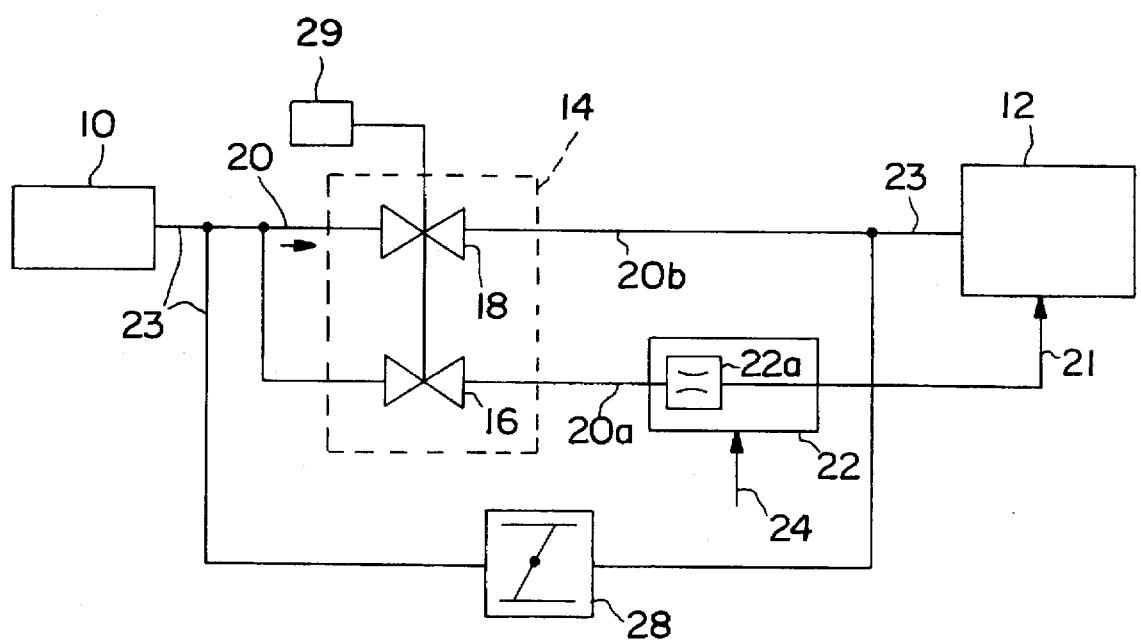
FIG. 1 illustrates a schematic illustration of a preferred arrangement of the valve devices of an apparatus according to the invention.

In detail, FIG. 1, shows a valve assembly 14 with a first valve 18, which can be considered the main valve, and a second valve 16, which acts as a secondary valve a or air enveloping valve. Throughout the disclosure and drawings, reference character 14 refers to a valve assembly. The two valves 16, 18 are in principle disposed parallel to one another, but a fuel metering device 22, in particular a set of injection nozzles, is located in series with the valve 16. The fuel metering device 22 is supplied with fuel, for example from a controlled fuel pump (not shown), via a fuel line 24 in a known manner, not to be described in further detail here. The quantity of operating medium supplied to the fuel metering device 22 from the outlet side of the valve 16 via a first flow line 20a, that is, aspirated or combustion air or a mixture of fresh air and recirculated exhaust gases, serves the purpose of so-called "air envelopment" for the injection nozzle or nozzles of the fuel metering device 22; the throttling action of the injection nozzle or nozzles in FIG. 1 is suggested by a throttle restriction 22a of the fuel metering device. The fuel mixture produced along with the enveloping air in the fuel metering device 22 is finally supplied to the engine 12, as schematically suggested in FIG. 1 by a mixture inlet line 21, for instance into the individual intake tubes of the cylinders directly upstream of the inlet valves. The outlet side of the other valve 18, conversely, communicates with a second flow line 20b directly with an intake line 23 of the engine 12, so as to supply idling air to the engine in a controlled way. A parallel path, into which a throttle valve 28 is inserted in the conventional way, is also provided, parallel to the above-described valve assembly 14, between the operating medium source 10 and the engine 12 or its intake line 23. If as suggested in FIG. 1 the throttle valve 28 assumes its closing position or is nearly closed, the operating medium or combustion air is supplied to the engine 12 via the valve assembly as follows: Upon actuation of the valve assembly with the aid of an associated, for instance electromechanical adjusting drive 29, the first valve 16 opens first, so that the fuel metering device 22 is supplied with enveloping air that assures effective mixture preparation in terms of the fuel supplied to the fuel metering device 22 via the fuel line 24. Not until the valve 16 is sufficiently opened, so as to supply the desired quantity of operating medium or combustion air to the fuel metering device 22, does the second valve 18 open, so as to supply the engine 12 in the usual way with the quantity of operating medium or combustion air that is required, in addition to the enveloping air supplied via the mixture inlet line 21, so that the idling rpm of the engine 12 can be maintained. Care must be taken that the throttling action of the elements of the fuel metering device 22, suggested by the throttle restriction 22a, be constant and greater than the throttling action of the second valve 18 in its fully opened state.

Figure 2:
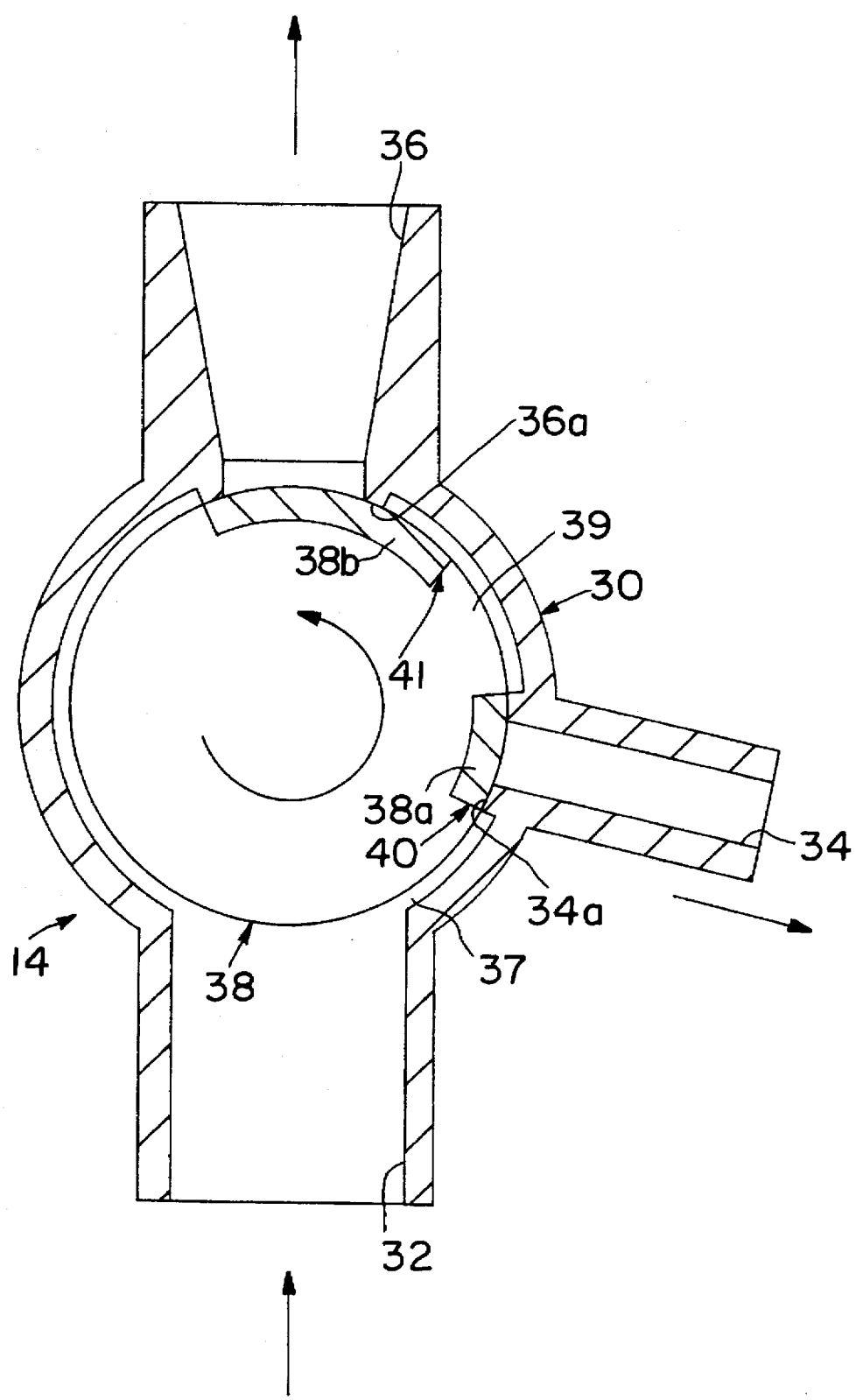
FIGS. 2–9c illustrate various preferred embodiments of apparatuses according to the invention.

As FIG. 2 shows, the valve assembly 14 described above in conjunction with FIG. 1 can be realized, in a first preferred exemplary embodiment of the invention, in the form of a rotary valve assembly or rotary adjuster. This rotary adjuster, as shown in FIG. 2, includes a housing 30 with an inlet 32, a first outlet 34 and a second outlet 36. The housing 30 defines a cylindrical chamber 37, in which a rotatable component 38 is disposed, which can be driven for counterclockwise rotation by an associated electromechanical adjusting drive 29 (FIG. 1), as represented by an arrow.

The rotatable component 38 carries two integrally formed-on or otherwise suitably firmly mounted valve closing members 38a and 38b, for instance in the form of tube segments, each embodied as curved valve slides, each with a curved sealing face on the circumference; the respective curved sealing faces are embodied as complementary to a respective sealing face 34a and 36a on the valve housing 30 surrounding the associated valve opening of the outlet 34 and 36 and are adjustable in a slidably displaceable manner relative to the respective associated sealing face 34a and 36a in order to uncover a desired valve opening cross section.

In the exemplary embodiment shown in FIG. 2, the valve closing members 38a and 38b may be considered to be parts of a cylindrical apron of the rotatable component 38, which between them in a circumferential direction define at least one recess 39 and in the axial direction, or in other words perpendicular to the plane of the drawing in FIG. 2, extend over at least the full height of the valve openings at the first outlet 34 and the second outlet 36. The outer faces, in terms of the radial direction, of the valve closing members 38a and 38b are consequently cylindrical surfaces. In a corresponding way, the sealing faces 34a and 36a on the inner end of the two outlets 34, 36 are also cylindrical surfaces; the pairs of complementary cylindrical surfaces can coincide sufficiently far in terms of area so that when the two valves 16, 18 (FIG. 1) are intended to be closed, a leakage flow can be avoided or at least reduced to a minimum. This closing position for the two valves or the two outlets 34, 36 is shown in FIG. 2. On the condition that the outlets 34 and 36 have a round opening cross section, which is advantageous and usual for engineering reasons, then beginning at the closing position shown in FIG. 2, upon a rotary motion of the rotatable component 38, first the first outlet 34 is uncovered by a rear control edge 40 of the first valve closing member 38, specifically being uncovered beginning at a point on the peripheral region of its valve opening. Upon further rotation of the rotatable component 38 counterclockwise, an increasingly larger, initially circular-segmental cross-sectional area of the valve opening at the first outlet 34 is then uncovered, so that the fuel metering device 22 is supplied with an increasing, controlled quantity of enveloping air. In this phase of operation, the second outlet 36 initially still remains closed, since the second valve closing member 38b extends over a larger arc or angle of arc, so that the rear edge 41, in terms of the direction of rotation, of the second valve closing member 38b does not reach the edge of the valve opening of the second outlet 36 for instance until the opening of the first outlet 34 of the associated valve closing member 38a has already been uncovered in part or even completely. In this connection it should be noted that in the case of a rectangular valve opening with an edge extending parallel to the rear edge of the associated valve closing member, the uncovering of the valve opening takes place along a line or a narrow axial gap, and this is likewise intended to be covered by the wording "beginning at a point on its peripheral region", especially since the vertical projection of the opening line, for instance in FIG. 2, likewise results in a point. On the other hand, an immediate uncovering of a gaplike opening, should that be undesired, can be avoided by disposing and embodying the rear edge of the valve closing member and the applicable edge of the associated opening in such a way that they extend toward one another at a certain angle, so that the opening begins at a point of the peripheral region of the valve opening, and upon further rotation of the rotatable component 38 a triangular opening cross section is first uncovered.

Figure 3:
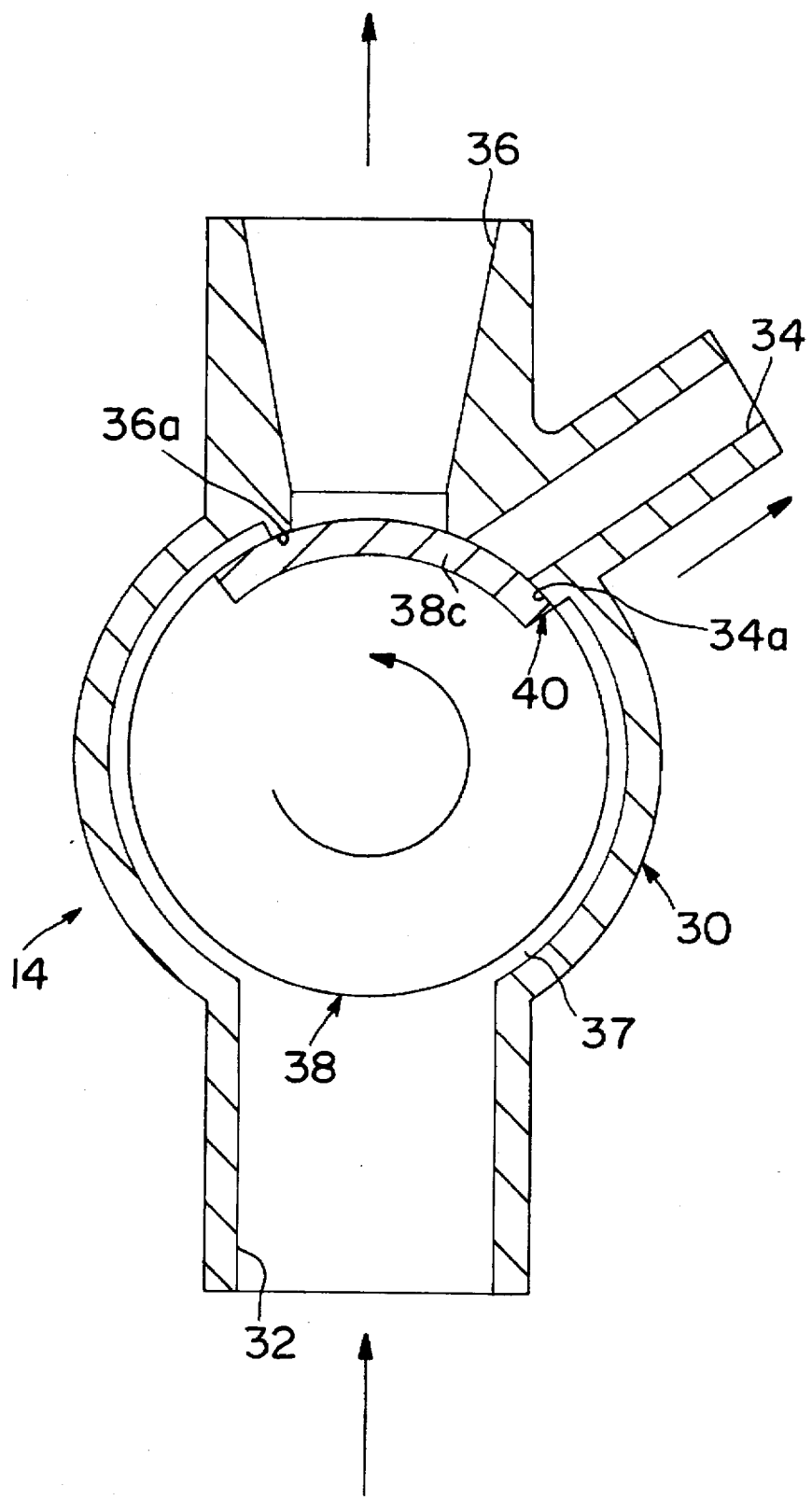

FIG. 3 of the drawing shows a version of a rotary valve assembly that is slightly modified compared with the exemplary embodiment of FIG. 2, for embodying the valve assembly 14 shown in FIG. 1. In the exemplary embodiment of FIG. 3, with otherwise a substantially identical layout to the rotary valve assembly of FIG. 2, the two outlets 34, 36 are disposed close together in the circumferential direction of the housing 30, and the two separate valve closing members 38a and 38b of FIG. 2 are combined into a single valve closing member 38c, which extends over a greater circumferential angle of the rotatable component 38. If this latter component, in the rotary valve assembly of FIG. 3, is rotated counterclockwise as indicated by an arrow, with the aid of the associated electromechanical adjusting drive, then by means of the common valve closing member 38c for the two outlets 34, 36, first the first outlet 34 is opened completely by the rear control edge 40, and only after that, with a delay corresponding to the distance between the valve openings of the two outlets 34, 36, is the opening of the valve opening at the second outlet 36 initiated by the control edge 40. A particular advantage of the rotary valve assembly of FIG. 3 is that the immediately adjacent valve housing faces 34a and 36a can be machined jointly in a single operation, and that only a single valve closing member 38c needs to be provided, which becomes particularly important if this component is manufactured separately and joined to the rotatable component 38 for instance by means of a screw connection.

Figure 4:
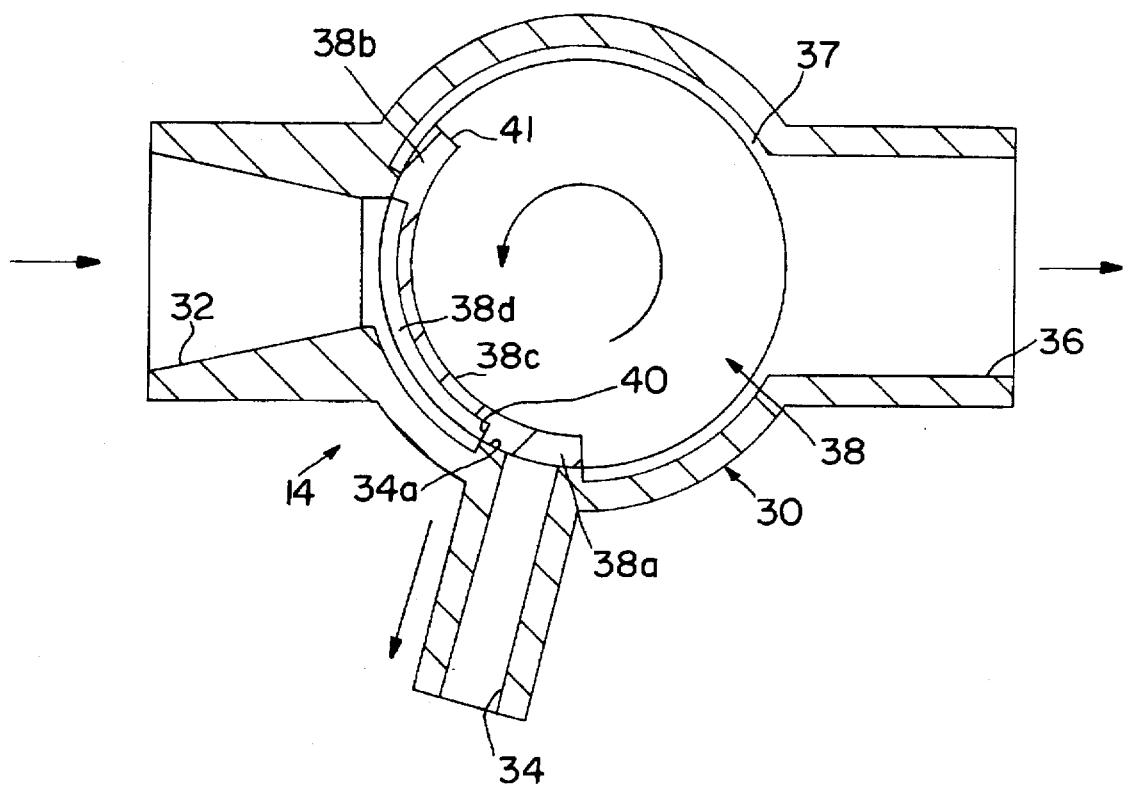

FIG. 4 shows a further exemplary embodiment of a valve assembly according to the invention. In this valve assembly, embodied as a rotary adjuster, and in which as in the exemplary embodiment of FIG. 2 a housing 30 with an inlet 32, a first outlet 34 and a second outlet 36 is again provided, in which a rotatable component 38 having two valve closing members 38a and 38b, which below for the sake of simplicity will be again combined into a unit 38c designed as a valve closing member, the first outlet 34 is however located behind the inlet 32 in terms of the direction of rotation of the rotatable component 38, or in other words counterclockwise. In the position of the rotatable component 38 shown in FIG. 4, the inlet 32 and the first outlet 34 are closed. If the rotatable component 38 is now rotated counterclockwise, then the first outlet 34 is first opened increasingly farther, by the valve closing member 38c extending over a relatively wide arc angle, for instance of more than 90°, to a recess 38d provided in the outer jacket face of the valve closing member 38c, so that combustion air can flow from the inlet 32 via the recess 38d, acting as a connecting conduit, as far as the rear control edge 40 on the valve closing member 38a and then can flow only to the first outlet 34. The inlet 32 opposite the cylindrical chamber 37 in the interior of the housing 30 initially remains closed. Not until the first outlet 34 is opened to the extent specified by the structural design of the housing 30 on the one hand and by the valve closing member 38c on the other does the rear edge 41, in terms of the direction of rotation of the valve closing member 38c enter the region of the valve opening of the inlet 32, so that this inlet is opened increasingly farther toward the chamber 37, and allows combustion air to flow to the second outlet 36 via the chamber 37 provided in the housing 30. Accordingly, once again, initially a flow cross section for the first outlet 34 is uncovered, and then with a specified delay a parallel flow cross section is uncovered for supplying combustion air for idling governing from the inlet 32 to the second outlet 36. The rotatable valve closing member 38c, embodied as a valve slide and replacing or combining the two separate valve closing members 38a and 38b, in its closing position shown in FIG. 4, assures a practically leakage-free closure of the valve assembly partially because of the sealing face 34a. The inlet 32 and the first outlet 34 may be embodied directly next to one another, in terms of the circumferential direction of the housing 30.

Figure 5A:
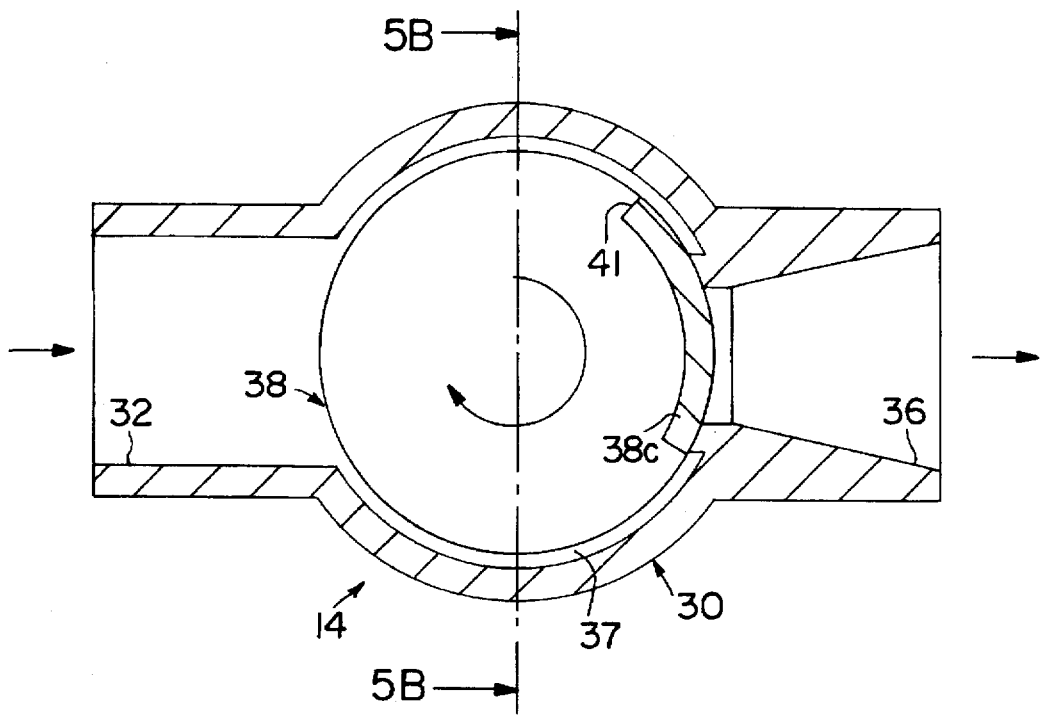
Figure 5B:
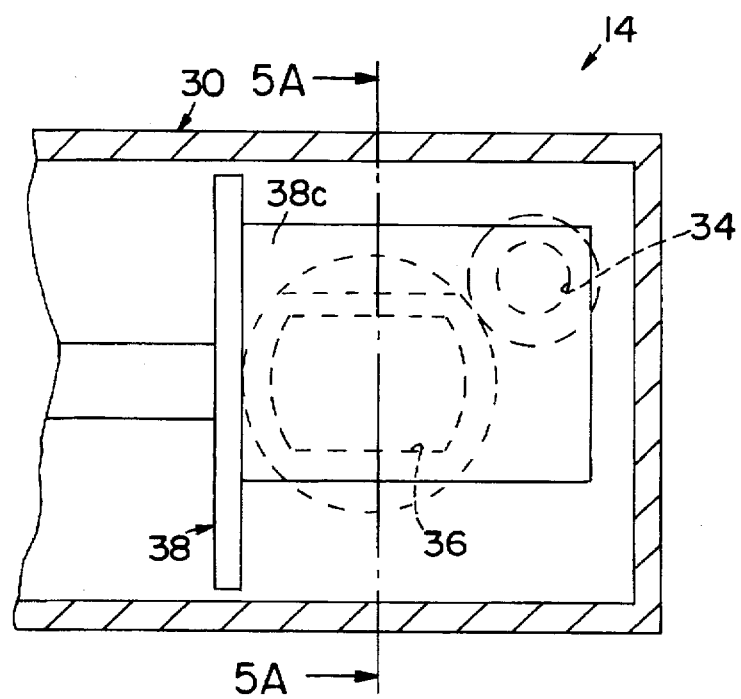

In FIGS. 5a and 5b of the drawing, a further rotary valve assembly according to the invention for embodying the valve assembly 14 of FIG. 1 is shown. This further modified rotary valve assembly is similar to that of FIG. 3 in the respect that once again only a single valve closing member 38c in the form of a tubular segment is provided; however, it differs from the exemplary embodiment described previously in that the two outlets 34, 36, offset in the circumferential direction, are also offset relative to one another in height, or in other words axially in the direction of the axis of rotation of the rotatable component 38, as is shown particularly clearly in FIG. 5b. As a result, partial overlapping of the two outlets 34, 36 in the circumferential direction is made possible, thus lending greater freedom in terms of the onset of supply of idling air to the engine 12, once the first outlet 34 for the enveloping air has first been opened more or less completely. In the exemplary embodiment in question, the point of the valve opening of the first outlet 34 that is located farthest to the rear in the circumferential direction and is opened last by the rear edge 41 of the valve closing member 38c in the course of a rotation thereof in the clockwise direction, is located in the axial direction substantially on a line with the forward edge of the valve opening of the second outlet 36. The uncovering of the valve opening at the second outlet 36 accordingly begins directly upon or after the complete uncovering of the valve opening at the first outlet 34 by the rear edge 41. From an engineering standpoint, the rotary valve assembly of FIGS. 5a and 5b offers similar advantages to the rotary valve assemblies of FIGS. 2-4 described above.

Figure 6A:
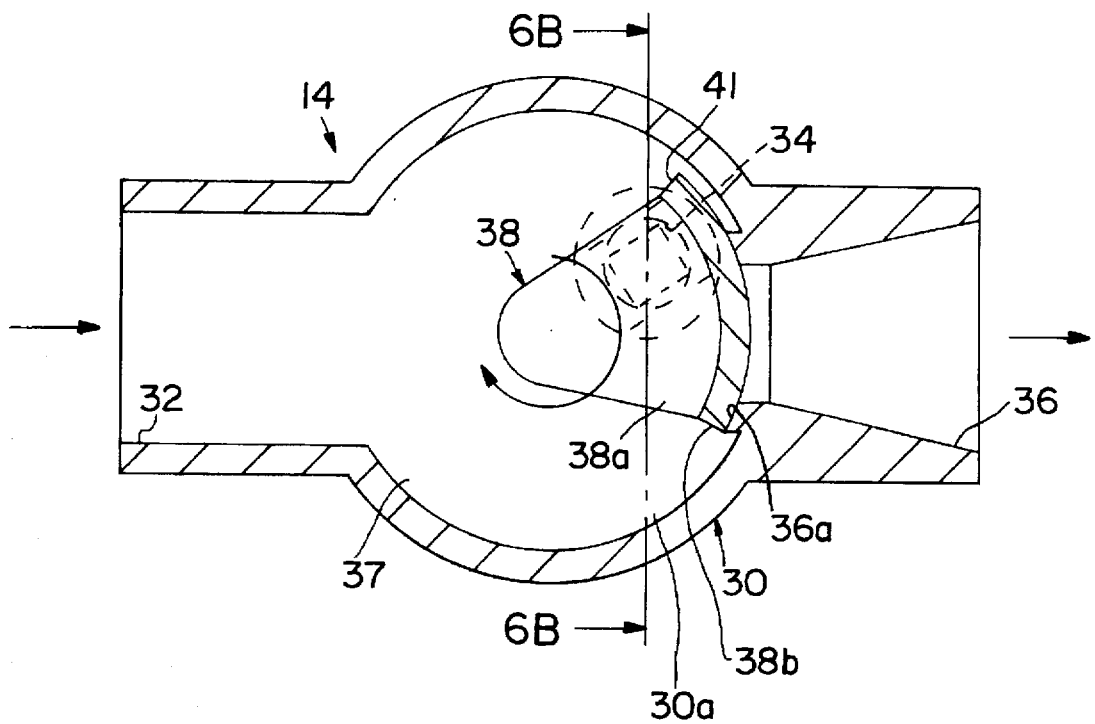
Figure 6B:
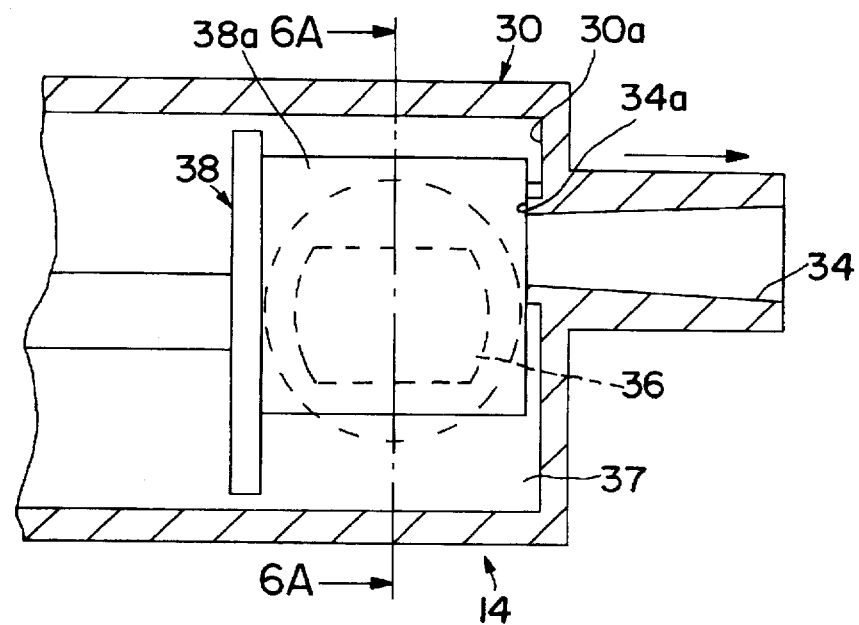

A further variant of a rotary valve assembly with the option of overlapping uncovering of the outlets 34 and 36 is shown in FIGS. 6a and 6b. In this further modified rotary valve assembly, the second outlet 36 is again provided in the wall of the housing 30 extending in the circumferential direction and is closeable and uncoverable with the aid of a valve closing member 38b, in the form of a tubular segment, on the rotatable component 38, similarly to the situation in the exemplary embodiment of FIG. 2. In the exemplary embodiment of FIGS. 6a and 6b, however, the first outlet 34 is provided on an end face 30a of the housing 30 and is closeable and uncoverable by means of a sector-shaped valve closing member 38a disposed at right angles to the axis of rotation of the rotatable component 38; the valve closing member 38a adjoins the upper, or righthand end in terms of FIG. 6 of the circumferentially extending valve closing member 38b, and extends beginning at the circumference thereof in sector shape radially inward toward the axis of rotation of the rotatable component 38.

One advantage of the valve construction of FIG. 6a and 6b over the exemplary embodiment of FIGS. 5a and 5b is that overall, a lower structural height can be attained.

While various rotary valve assemblies or rotary adjusters have been described above for embodying the valve assembly 14 of FIG. 1, such a valve assembly 14, with two valves connected in principle parallel, can also be achieved in a further feature of the invention with the aid of a reciprocating or piston adjuster with axially adjustable valve closing members.

Figure 7:
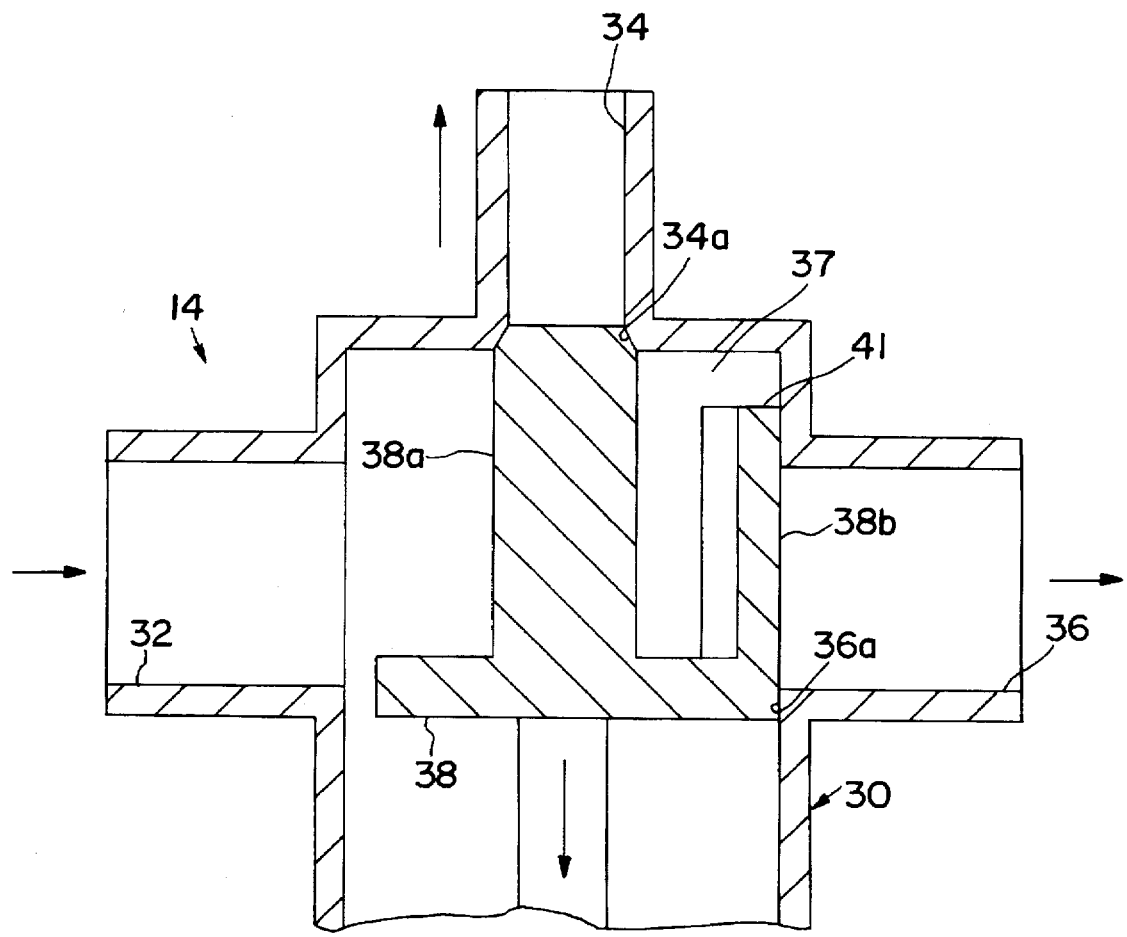

One such reciprocating adjuster is shown in FIG. 7. The valve assembly embodied as a reciprocating adjuster shown in FIG. 7 again has a housing 30, which defines a cylindrical chamber 37, which is provided with a radial inlet 32, an axial first outlet 34, and a radial second outlet 36. In the valve assembly of FIG. 7, the movable element 38 connected to the adjusting drive (not shown) replaces the rotatable component 38 of the exemplary embodiments discussed above and is an element that is adjustable in the axial direction, as indicated by an arrow, for opening the outlets 34, 36 and that has two valve closing members 38a and 38b for cooperation with the valve openings on the first outlet 34 and on the second outlet 36, respectively.

In detail, the valve closing member 38a is a cylindrical element of the side of the movable component 38 remote from the adjusting drive, and on its free end it has a conical valve face for cooperation with a conical seat 34a at the valve opening of the first outlet 34. Because of this design, the cross section of the first outlet 34, as in conventional valves with an axially adjustable valve body, is already uncovered upon a slight stroke of the axially adjustable component 38, which is not of critical importance in the sense that the fuel metering device 22, which as noted at the outset has its own throttle restriction 22a is connected to the first outlet 34. The second valve closing member 38b may be considered to be a wall region of a cylindrical apron of the movable component 38, and when the second outlet 36 is closed, it rests sealingly against the cylindrical inner wall surface 36a of the chamber 37 defined by the housing 30.

Once the first outlet 34, in the initial phase of an axial motion of the movable component 38, has been substantially completely uncovered by its associated valve closing member 38, a further axial motion of the movable component 38, brought about by the adjusting drive, causes the second outlet 36 to be opened increasingly farther by the rear edge 41 in a defined way—in FIG. 7, from top to bottom—by axial shifting of its slidelike valve closing member 38b. In this case as well, as explained in conjunction with the exemplary embodiment of FIG. 2, it is possible by suitable design of the peripheral curve of the valve opening at the second outlet 36 on the one hand and of the shape of the valve closing member 38b on the other once again to specify the desired linkage between the axial position of the movable component 38 and the uncovered cross section for the second outlet 36, depending on the particular requirements.

Figure 8:
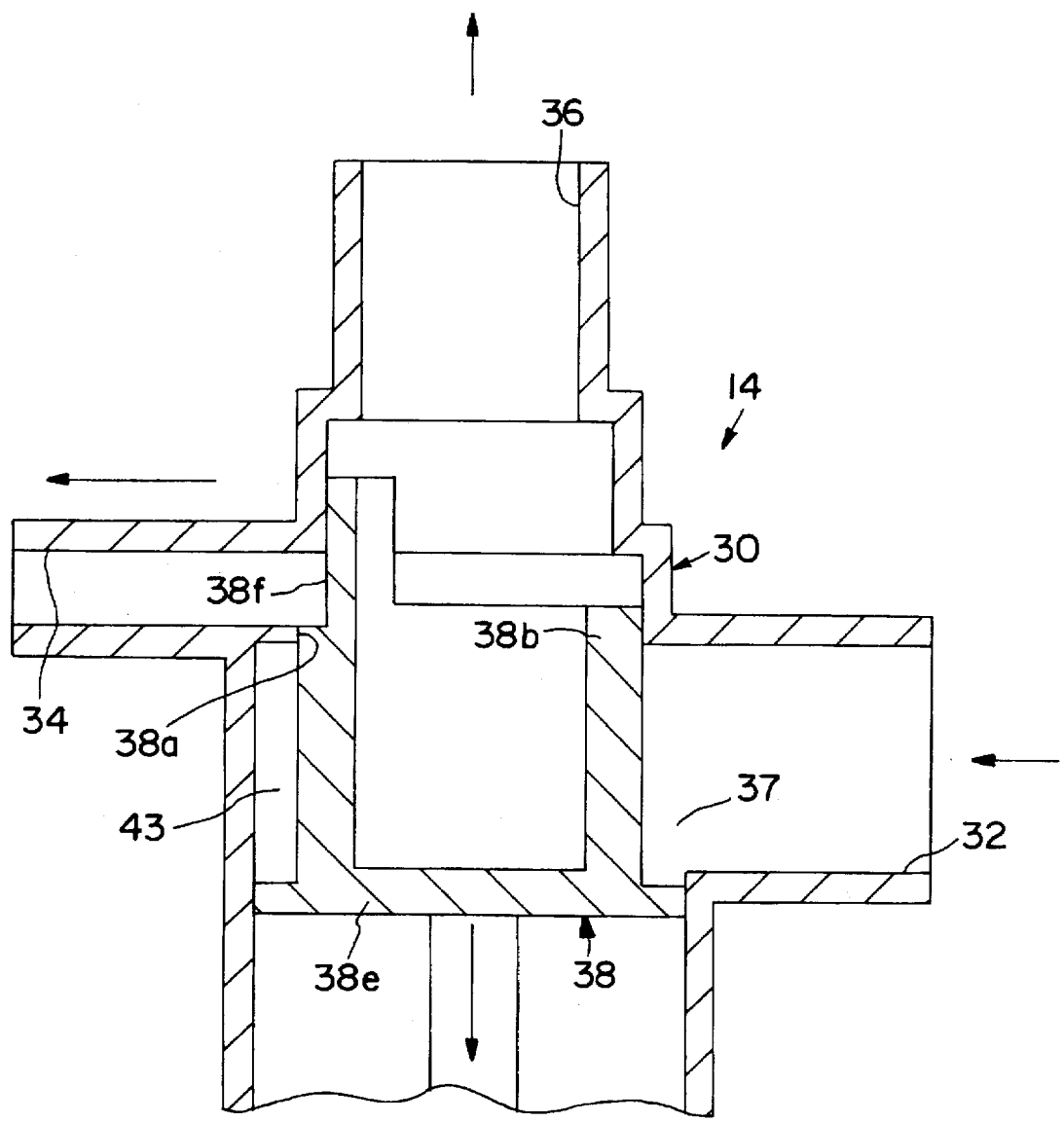

FIG. 8 of the drawing, as a further exemplary embodiment, shows a valve assembly according to the invention embodied as a reciprocating or piston adjuster; it can be considered a variant of the piston adjuster of FIG. 7.

In detail, the valve assembly of FIG. 8 has a housing 30 with a radially disposed inlet 32 and a first outlet 34 diametrically opposite it, which however, is offset in height or in the axial direction from the inlet 32—upward, in terms of FIG. 8. The second outlet 36 in the exemplary embodiment in question is disposed as an axial outlet above the radial first outlet 34.

In the interior 37 of the housing 30, an axially adjustable, pistonlike component 38 is again provided, which beginning at the closing position shown in FIG. 8 can be moved axially downward, as indicated by an arrow, with the aid of the associated electromechanical adjusting drive (not shown), so as to open the outlets 34 and 36 in succession, in that order.

Figure 8A:
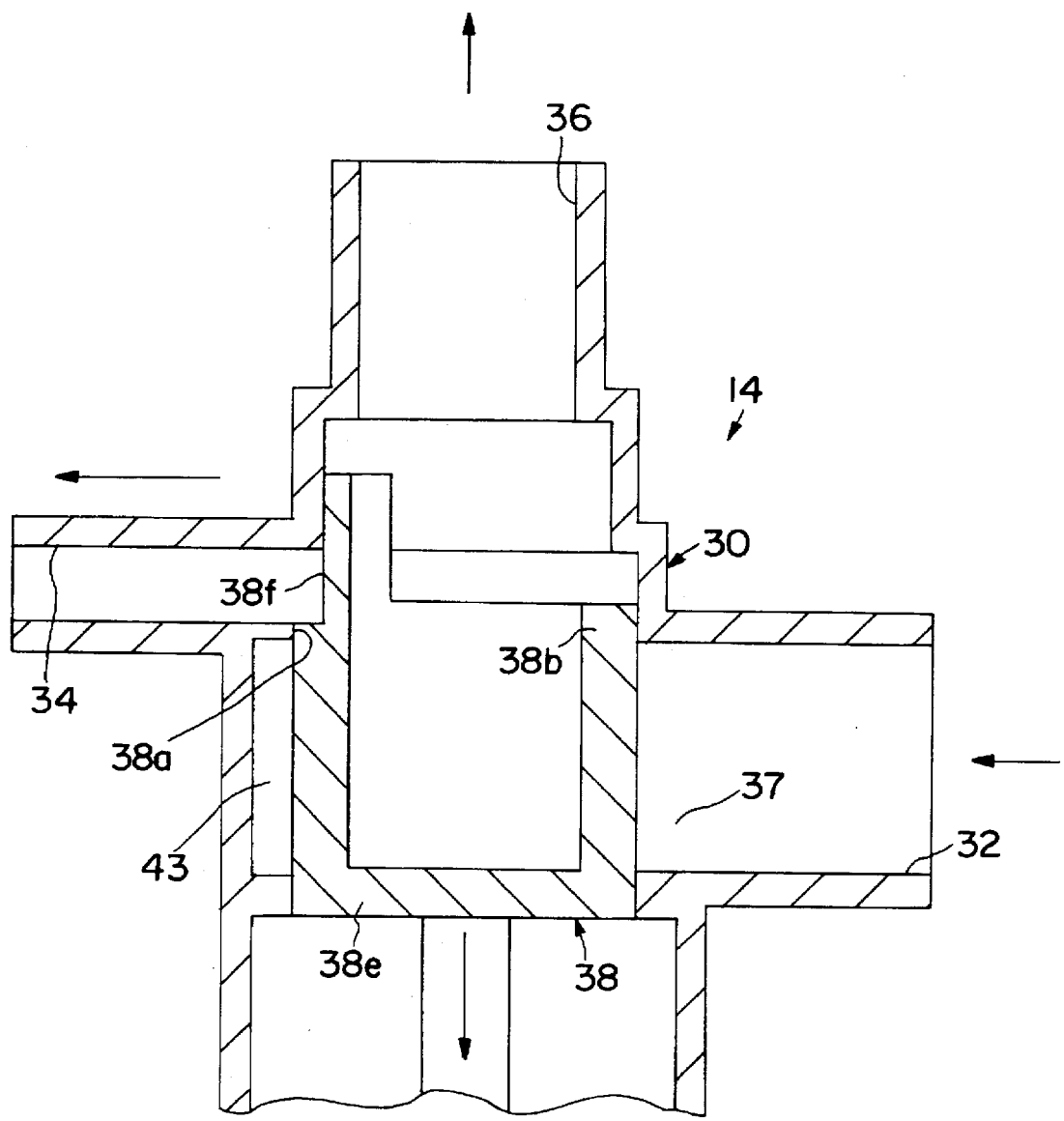

In the exemplary embodiment in question, the adjustable component 38 again has two valve closing members 38a, 38b, which can be considered to be parts of a piston apron or as part of a cylinder, and of which the valve closing member 38b is disposed at the inlet 32 while the valve closing member 38a is disposed at the first outlet 34. Unlike the exemplary embodiment of FIG. 7, the valve closing members 38a, 38b in the exemplary embodiment of FIG. 8 are recessed radially inward relative to the platelike base 38e of the adjustable component 38, and as a result together with the inner wall of the housing 30 they define an annular conduit 43. The valve closing member 38a is also provided with a step or radial recess 38f at the first outlet 34. The annular conduit 43 could also be formed by a groove in the inner wall of the housing 30 as shown in FIG. 8a. The conduit 43 may also be a hollow chamber that communicates with the inlet 32 through a connecting conduit, not shown.

In the design, described, a downward motion of the adjustable component 38, in the direction of the arrow shown, causes the recess 38f to be opened to the annular conduit 43, thus initially making a connection between the inlet 32 and the first outlet 34, while the second outlet 36 initially still remains closed. Not until a predetermined opening cross section for the first outlet 34 has been uncovered does the upper edge of the valve closing member 38b enter the region of the valve opening at the inlet 32, so that combustion air can now flow from the inlet 32 into the interior 37 of the housing 30 and from there reaches the second outlet 36. In the exemplary embodiment of FIG. 8 as well, the practically leakage-free closure at the inlet 32 sought in accordance with the invention and the chronologically staggered opening of the outlets 34 and 36 are again attained.

Figure 9A:
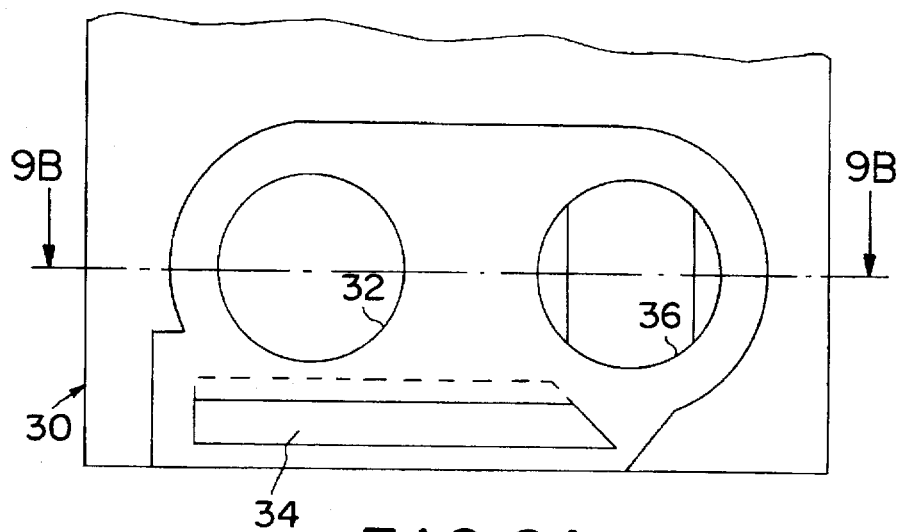
Figure 9B:
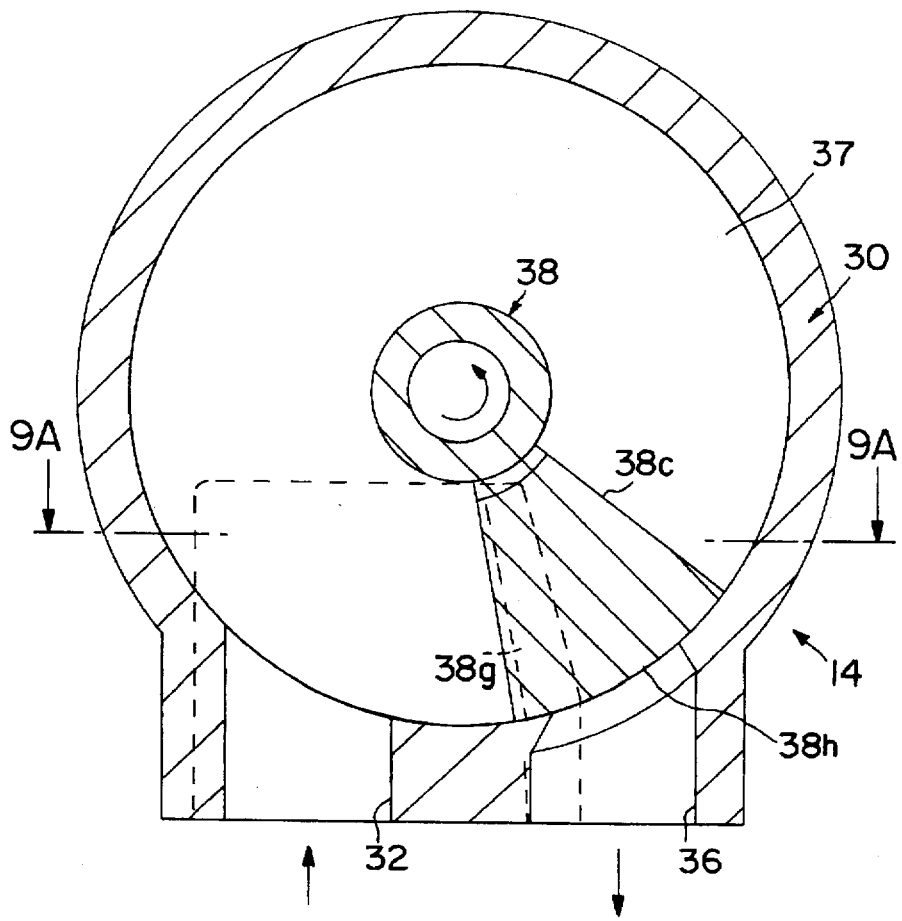
Figure 9C:
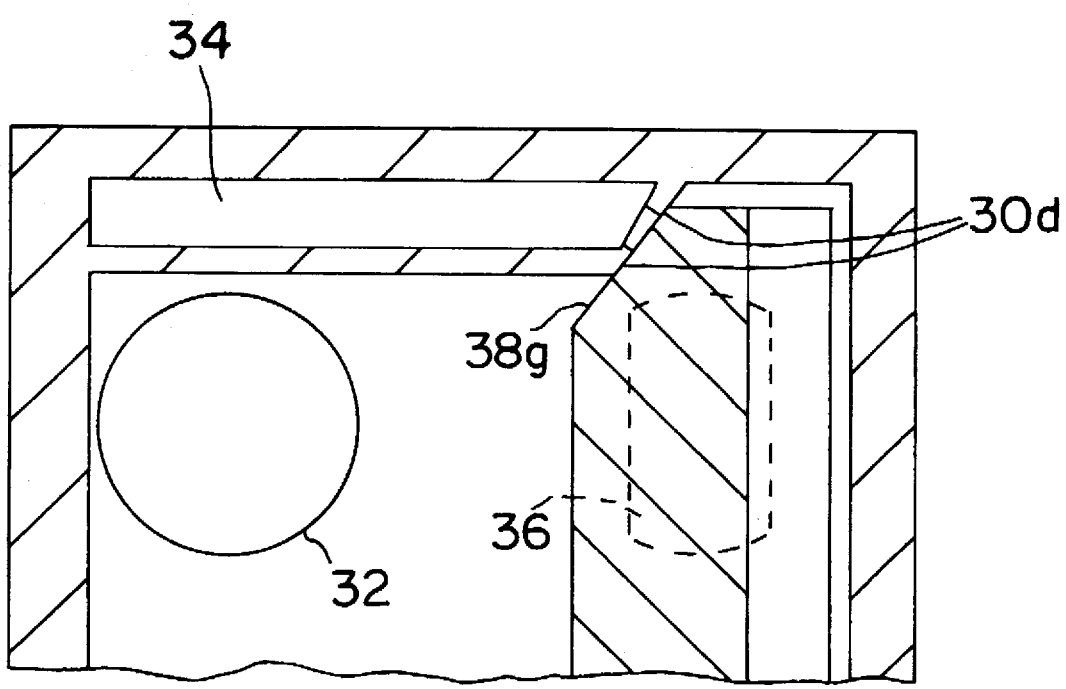

Another advantageous exemplary embodiment of a valve assembly according to the invention is shown in FIGS. 9a–9c. In this valve assembly, the inlet 32 and the second outlet 36 are embodied as radial inlet and outlet devices located at the same height, while the first outlet 34 is provided at a second, lower level in the exemplary embodiment, in the form of an elongated outlet in the wall of a cylindrical housing 30. In the interior 37 of the housing, a rotatable component 38 is once again provided—that is, the valve assembly of FIGS. 9a–9c is again embodied as a rotary adjuster which which has a single valve closing member 38c of circular— sectorlike cross section, which performs the function of the separate valve closing members 38a, 38b of the exemplary embodiments of the previous drawing figures.

In the closing position shown in FIG. 9b of the valve assembly in question, the valve closing member 38c closes the first outlet 34 with an oblique sealing face 38g, which rests on an oblique sealing face 38d complementary to it of the housing, and it closes the second outlet 36 with a curved sealing face 38a extending in the circumferential direction. Upon counterclockwise rotation of the rotatable component 38, the oblique sealing face 38g first lifts perpendicularly to a certain extent from the oblique sealing face 30d provided on the housing 30, and as a result the first outlet 34 is uncovered to the interior 37, while the second outlet 36 continues to be closed by the circumferentially extending sealing face 38h, which extends over a correspondingly larger arc. Not until the first outlet 34 is uncovered to the desired cross section does opening of the valve opening at the second outlet 36 to the interior 37 begin, upon further rotation of the sectorlike valve closing member 38c.

The valve assembly of FIGS. 9a–9c is especially advantageous in the sense that the opening for the first outlet 34 is effected, similarly to the situation with a reciprocating adjuster, by means of a particular movement apart of the sealing faces 38g, 30d, so that by slightly rotating the component 38 with the aid of the associated adjusting drive, a practically complete opening of the first outlet 34 can be rapidly achieved. On the other hand, an excellent sealing action can be attained for both outlets 34, 36, because when the oblique sealing face 38g provided on the valve closing member 38c slides in wedgelike fashion onto the oblique sealing face 30d of the housing 30, a superficial contact between the parts that are movable relative to one another is again attained, as with the sealing face 38h extending circumferentially.

In summary, from the above description it becomes clear that a valve assembly on the basic principle described in conjunction with FIG. 1, namely with valves disposed parallel to one another and uncoverable in succession can be achieved to meet given requirements structurally in the most various ways by means of suitably embodied reciprocating adjusters or rotary adjusters, which can be manufactured economically with a comparatively simple design and high function reliability.

The foregoing relates to preferred exemplary embodiments of the invention, it being understood that other variants and embodiments thereof are possible within the spirit and scope of the invention, the latter being defined by the appended claims.

What is claimed is:

1. An apparatus for governing an idling rpm of an internal combustion engine by controlling a quantity of operating medium that is supplied from a source of an operating medium to the engine via at least two flow lines, comprising a first valve opening cross section at a first valve opening for a first flow line and a second valve opening cross section at a second valve opening for a second flow line which are controllable by means of associated valve closing devices, the first flow line leads to a fuel metering device and the second flow line leads to an intake conduit of the engine downstream of a throttle valve disposed in an intake conduit, and the valve closing devices are adjustable from a closing position into an opening position by means of an adjusting drive with increasing activation of the adjusting device, the valve closing devices include two valve closing members (38a, 38b), which are embodied as valve slides, said valve closing members have a sealing face embodied as complementary to a sealing face (34a, 36a), surrounding the valve opening (34, 36), of a housing (30), and are provided on a component (38, 38c) movable in a housing (30) and are combined into a single unit (38c) extending over an arc angle, said single unit is provided on an outer jacket face with a recess (38d, 38f), that extends over an arc angle between the valve closing members (38a, 38b), upon movement of the movable component (38), beginning at a closed position in which an inlet (32) of the housing (30) communicates with the operating medium source (10) is closed relative to the interior (37) of the housing, an increasingly larger quantity of operating fluid is initially supplied to a first outlet (34), through said recess which forms the first flow line (20a) branching off from the housing (30), and that only then, upon a further movement of the movable component

(38) in a specified direction of movement a flow cross section for the second flow line (20b) is uncovered by the second valve closing member (38b) via the interior (37) of the housing (30) which leaves via a second outlet (36) of the housing (30).

2. The apparatus of claim 1, in which an annular conduit (43) is formed between an inner well of the housing (30) and an outer wall of the valve closing members (38a, 38b) that is offset radially inward on the movable component (38).

3. The apparatus of claim 1, in which an annular conduit (43) is formed by a groove in an inner wall of the housing (30) and by a cylindrical well of the movable component (38).

* * * * *